United States Patent
Schmid (10) Patent No.: US 7,986,138 B2
(45) Date of Patent: Jul. 26, 2011

(54) METHOD AND DEVICE FOR MEASURING THE POLE POSITION ANGLE OF A MAGNETIC LEVITATION VEHICLE OF A MAGNETIC LEVITATION SYSTEM

(75) Inventor: Robert Schmid, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 232 days.

(21) Appl. No.: 12/515,542

(22) PCT Filed: Nov. 15, 2007

(86) PCT No.: PCT/EP2007/062371
§ 371 (c)(1),
(2), (4) Date: May 20, 2009

(87) PCT Pub. No.: WO2008/065004
PCT Pub. Date: Jun. 5, 2008

(65) Prior Publication Data
US 2010/0060269 A1    Mar. 11, 2010

(30) Foreign Application Priority Data

Nov. 28, 2006  (DE) .......................... 10 2006 057 062

(51) Int. Cl.
*G01B 7/30* (2006.01)
(52) U.S. Cl. .............................. 324/207.11; 324/207.25
(58) Field of Classification Search .......................... None
See application file for complete search history.

(56) References Cited

U.S. PATENT DOCUMENTS

| 2,066,744 A * | 1/1937 | Schweyer ..................... 246/194 |
| 4,603,640 A | 8/1986 | Miller et al. |
| 4,607,203 A | 8/1986 | Böhm et al. |
| 7,420,363 B2 * | 9/2008 | Hatanaka et al. ........ 324/207.25 |
| 2010/0019763 A1 * | 1/2010 | Schmid .......................... 324/260 |

FOREIGN PATENT DOCUMENTS

| DE | 2610752 A1 | 9/1977 |
| DE | 8023644 U1 | 5/1982 |
| DE | 3150353 A1 | 6/1983 |
| DE | 3303961 A1 | 8/1983 |
| DE | 3433149 C2 | 11/1992 |
| EP | 511459 A2 * | 11/1992 |

OTHER PUBLICATIONS

German Office Action dated Aug. 1, 2007.
International Search Report dated Feb. 13, 2008.

\* cited by examiner

*Primary Examiner* — Paresh Patel
(74) *Attorney, Agent, or Firm* — Laurence A. Greenberg; Werner H. Stemer; Ralph E. Locher (57) ABSTRACT

A method for measuring the pole position angle between the magnetic field of a track-side stator of a magnetic levitation train track and the magnetic reference axis of a magnetic levitation vehicle located on the track. When the levitation magnet of the magnetic levitation vehicle is energized, a direction component of the magnetic field of the stator, which component is predefined by a preferred measurement direction of the magnetic field sensors, is measured using a pair of magnetic field sensors, and the pole position angle is determined using the measured values of the two magnetic field sensors. The preferred measurement direction is set in such a way that at least one of the two magnetic field sensors has a minimum measurement sensitivity for the magnetic field of the levitation magnet.

18 Claims, 7 Drawing Sheets

METHOD AND DEVICE FOR MEASURING THE POLE POSITION ANGLE OF A MAGNETIC LEVITATION VEHICLE OF A MAGNETIC LEVITATION SYSTEM

BACKGROUND OF THE INVENTION

Field of the Invention

The invention relates to a method for measurement of the pole position angle between the stator magnetic field of a track-side stator of a magnetic levitation railroad track and the magnetic reference axis of a magnetic levitation vehicle that is located on the magnetic levitation railroad track. When the supporting magnet of the magnetic levitation vehicle is switched on, a pair of magnetic field sensors are used to measure a direction component of the stator magnetic field, which direction component is predetermined by a preferred measurement direction of the magnetic field sensors, and the measured values from the two magnetic field sensors are used to determine the pole position angle.

Pole position measurement devices for magnetic levitation vehicles for measurement of the pole position angle are in use, for example, with the Transrapid. The pole position measurement devices are fitted at the front and rear, to be precise on both vehicle sides—that is to say on the left and right seen in the direction of travel—and are each equipped with a pair of magnetic field sensors for measurement of the stator magnetic field of the track-side stator of the magnetic railroad track. The positioning and method of operation of the pairs of sensors will be described in the following text using the front right-hand pair of sensors, by way of example; however, the explanations apply analogously to the other pairs of sensors. The magnetic field sensors of the front right-hand pair of magnetic field sensors are each themselves attached to a mount, on which the front right-hand supporting magnet of the magnetic levitation vehicle is also mounted. The distance between the two magnetic field sensors is normally $\tau/2$, where $\tau$ is the wavelength of the fundamental of the track-side stator magnetic field and, in the case of Transrapid by way of example, is 258 mm. An evaluation device is connected to the two magnetic field sensors of the pair of magnetic field sensors, and uses the measured values from the two magnetic field sensors to determine the pole position angle between the stator magnetic field of the track-side stator and the magnetic reference axis of the magnetic levitation vehicle. Transrapid uses Hall sensors as the measurement sensors, which measure on a directionally sensitive basis by virtue of their design, and accordingly each have a preferred measurement direction for which they are sensitive. The Hall sensors measure a predetermined direction component of the stator magnetic field, to be precise the x component of the magnetic field, that is to say the component in the vehicle longitudinal direction or direction of travel, or the z component, that is to say that component which is aligned vertically upward or downward with respect to the vehicle longitudinal direction.

BRIEF SUMMARY OF THE INVENTION

Against the background of a method of the described type, the invention is based on the object of developing this further in order to achieve even better measurement accuracy.

According to the invention, this object is achieved by a method having the features of the independent claim(s). Advantageous refinements of the invention are specified in the dependent claims.

The invention provides that the preferred measurement direction of the magnetic field sensors is set such that at least one of the two magnetic field sensors has a minimum measurement sensitivity for the supporting magnet field of the supporting magnet.

One major advantage of the invention is that the alignment of the at least one magnetic field sensor as provided according to the invention considerably reduces measured-value corruption resulting from the supporting magnet field of the supporting magnet and therefore makes it possible to achieve considerably more accurate pole position measured values than would be possible without the alignment according to the invention. In this case, the invention makes use of the knowledge that the supporting magnet field can have a not inconsiderable influence on the measurement of the stator magnetic field when a poor measurement direction is set for the magnetic field sensors and a poor direction component of the stator magnetic field is therefore measured: for example, if the magnetic field sensors are used for measurement in a measurement direction in which the supporting magnet field has a high field vector component, then a quite inaccurate measured value will be formed for the stator magnetic field while, in contrast, if the measurement direction is at right angles to this, it is possible to achieve a measured value of the stator magnetic field which is better for determination of the pole position angle. This is the situation on which the invention is based, in that the invention provides that the preferred measurement direction of the magnetic field sensors is set deliberately such that the influence of the supporting magnet is small.

The preferred measurement direction can be determined in a particularly simple manner, and therefore advantageously, when the measurement direction for which the at least one magnetic field sensor measures a minimum measured value of the supporting magnet field is measured, and when this measurement direction is used as the preferred measurement direction for the measurement of the pole position angle.

Alternatively, but likewise easily and advantageously, the preferred measurement direction can be determined in that the measurement direction for which the at least one magnetic field sensor measures a maximum measured value for the supporting magnet field is measured; in this case, the direction which is at right angles to this measurement direction is used as the preferred measurement direction for the measurement of the pole position angle.

Since the supporting magnet field interferes to a greater extent with the measurement result on that magnetic field sensor which is located closer to the supporting magnet than with the measurement result of that magnetic field sensor which is located further away from the supporting magnet, it is considered to be advantageous if the preferred measurement direction is chosen so that the magnetic field sensor which is located closer to the supporting magnet has a minimum measurement sensitivity for the supporting magnet field. The preferred measurement direction of the magnetic field sensor which is located further away is preferably set in precisely the same way as that of the magnetic field sensor which is located closer, such that the preferred measurement directions of the two magnetic field sensors are identical and parallel.

In order to allow the desired preferred measurement direction to be set particularly easily, a first preferred variant of the method provides magnetic field sensors which can rotate to be used. One magnetic field sensor is preferably first of all rotated such that it has a minimum measurement sensitivity for the supporting magnet field, and the other of the two magnetic field sensors is then rotated in the same measurement direction, as a result of which both magnetic field sensors are moved in the same preferred measurement direction.

In another preferred variant of the method, magnetic field sensors can be used which are each formed by two individual sensors which are aligned at right angles to one another. The measurement results from the two individual sensors of the at least one magnetic field sensor are preferably used to determine the measurement direction for which a minimum measurement sensitivity is achieved for the supporting magnet field; this measurement direction determined in this way is treated as the preferred measurement direction, and the measurement results of the individual sensors of each magnetic field sensor are then each evaluated, forming a measured value for this preferred measurement direction.

Incidentally, the two magnetic field sensors of the pair of magnetic field sensors need not be identical; for example, one of the two magnetic field sensors may be formed by a magnetic field sensor which can rotate, and the other of the two magnetic field sensors may be formed by two individual sensors which are aligned at right angles to one another.

Irrespective of the detailed configuration of the magnetic field sensors, the preferred measurement direction is preferably determined with the stator magnetic field switched off. Specifically, if the measurement is carried out with the stator magnetic field switched off, then the direction of the supporting magnet field can be determined particularly accurately, because there can be no disturbance from the stator magnetic field; this allows the optimum measurement direction to be determined for subsequent measurement of the stator magnetic field.

Since the magnetic field distribution and therefore the influence of the supporting magnet field on the pole position measurement is dependent to a certain degree on the respective gap between the supporting magnet and the reaction rail of the magnetic levitation railroad track, a further preferred refinement of the invention provides that the respective gap distance between the supporting magnet and the track-side reaction rail of the magnetic levitation railroad track is measured with the stator magnetic field switched on, and the preferred measurement direction is set such that it corresponds to a preset value which is predetermined individually for the gap distance.

By way of example, the preset value which is predetermined individually for the gap distance is determined in that that measurement direction for which the at least one magnetic field sensor has a minimum measurement sensitivity for the supporting magnet field is in each determined, individually for the gap distance, for different gap distances in each case and with the stator magnetic field switched off, and in that the measurement direction, which is determined individually for the gap distance, is used as the preset value which is predetermined individually for the gap distance.

The magnitude of the supporting magnet current also plays a certain role, because stronger supporting magnet fields are formed when the supporting magnet currents become larger, and their field distribution may differ somewhat from that in the case of weaker supporting magnet fields, because of saturation phenomena. A further advantageous refinement of the invention therefore provides that the respective supporting magnet current is measured with the stator magnetic field switched on, and that the preferred measurement direction is set such that it corresponds to a preset value which his predetermined individually for the supporting magnet current.

The preset value which is predetermined individually for the supporting magnet current may, for example, be determined in that that measurement direction for which the at least one magnetic field sensor has a minimum measurement sensitivity for the supporting magnet field of the supporting magnet is in each case determined individually for the supporting magnet current, for different supporting magnet currents in each case, and in that the measurement direction which is determined individually for the supporting magnet current is used as the preset value which is predetermined individually for the supporting magnet current.

Incidentally, both the influence of the gap and the influence of the supporting magnet current can be taken into account in that the respective supporting magnet current and the respective gap are measured with the stator magnetic field switched on, and in that the preferred measurement direction is set such that it corresponds to a preset value which is predetermined individually for the gap and supporting magnet current. In this variant, the preset value is therefore determined as a function of two parameters, specifically the gap and the supporting magnet current. The preset values for the preferred direction may, for example, be stored in a table as a function of gap and current values, and may be read from this table during the course of the method.

The invention also relates to a pole position measurement device for a magnetic levitation vehicle of a magnetic levitation railroad having a pair of magnetic field sensors for measurement of the stator magnetic field of a track-side stator, with the two magnetic field sensors of the pair of magnetic field sensors being arranged at a predetermined distance from one another, and having an evaluation device, which uses the measured values from the two magnetic field sensors to determine the pole position angle between the stator magnetic field and the magnetic reference axis of the magnetic levitation vehicle. A pole position measurement device such as this is likewise known from Transrapid.

Against this background, the invention is based on the object of specifying an even more accurate pole position measurement device than in the past.

According to the invention, this object is achieved in that a preferred measurement direction can be set for the magnetic sensors of the pair of magnetic field sensors such that a desired direction component of the stator magnetic field can be measured; in addition, the evaluation device is designed such that it sets the preferred measurement direction such that at least one of the two magnetic field sensors has a minimum measurement sensitivity for the supporting magnet field of the supporting magnet.

With respect to the advantages of the pole position measurement device according to the invention and with respect to the advantages of advantageous refinements of the pole position measurement device according to the invention, reference should be made to the above statements relating to the method according to the invention, since the advantages of the method according to the invention correspond essentially to the advantages of the pole position measurement device according to the invention.

BRIEF DESCRIPTION OF THE SEVERAL VIEWS OF THE DRAWING

The invention will be explained in more detail in the following text using exemplary embodiments; in this case, by way of example.

DESCRIPTION OF THE INVENTION

For clarity reasons, the same reference symbols are used for identical or comparable components in FIGS. 1 to 12.

Figure 1:
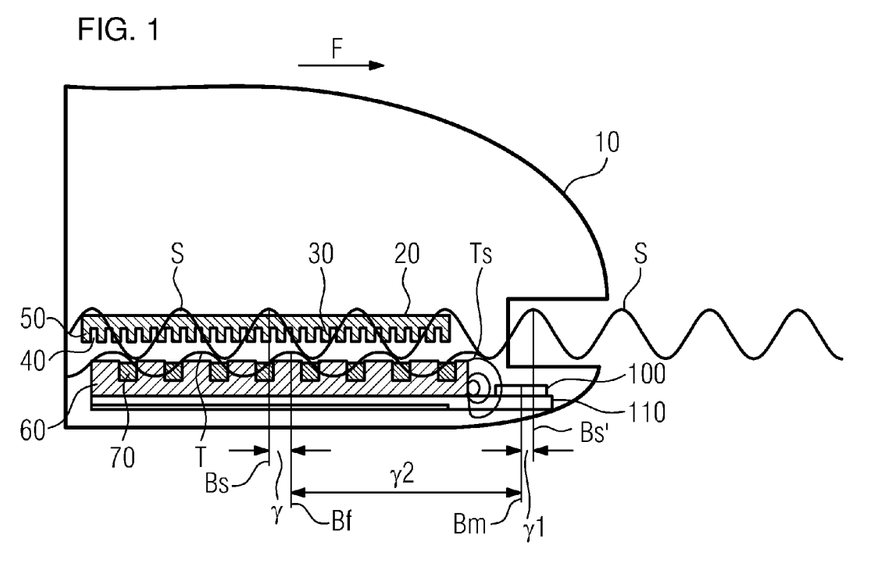
FIG. 1 shows a magnetic levitation vehicle with a pole position measurement device.

FIG. 1 shows the front area of a magnetic levitation vehicle 10, which is located on a magnetic levitation railroad track 20. Of the magnetic levitation railroad track, FIG. 1 shows a track-side stator 30, which is equipped with stator slots 40 and stator teeth 50.

Magnet coils, which are not illustrated in any more detail in FIG. 1, are located in the stator slots 40 in order to produce a stator magnetic field. The fundamental of the stator magnetic field is identified by the reference symbol S in FIG. 1. A magnetic reference axis Bs of the stator 30 is defined by the arrangement and the position of the magnet coils.

Only a section of the stator 30 is illustrated in FIG. 1; the stator 30 extends over the entire track of the magnetic levitation railroad and thus—as can be seen in FIG. 1—also produces the stator magnetic field S in front of the magnetic levitation vehicle 10.

FIG. 1 also illustrates a front supporting magnet 60 of the magnetic levitation vehicle 10; this is equipped with magnet coils 70 which produce a supporting magnet field in order to lift the magnetic levitation vehicle 10. The supporting magnet field is identified by the reference symbol T in FIG. 1. A magnetic reference axis Bf of the magnetic levitation vehicle 10 is defined by the arrangement and the position of the supporting magnet 60.

A pole position measurement device 100 is fitted in front of the supporting magnet 60 in the direction of travel F; the purpose of the pole position measurement device 100 is to determine the pole position angle γ between the magnetic reference axis Bs of the stator and the magnetic reference axis Bf of the magnetic levitation vehicle 10.

By way of example, the pole position measurement device 100 is mounted with the supporting magnet 60 on a common support 110 of the magnetic levitation vehicle 10.

As can be seen in FIG. 1, although the pole position measurement device 100 is located a short distance away from the supporting magnet 60, it is nevertheless located in the area of influence of a disturbance field component Ts of the supported magnet field T. The disturbance field component Ts is illustrated only schematically in FIG. 1; it extends from the right-hand edge of the supporting magnet 60 forward in the direction of travel F, into the measurement area of the pole position measurement device 100, as well.

In order to measure the stator magnetic field as accurately as possible, directionally selective magnetic field sensors of the pole position measurement device 100 are aligned such that that magnetic field sensor which is located closer to the supporting magnet 60 detects as little as possible of the disturbance field component Ts of the supporting magnet field T; this will be explained in detail in the following text.

Figure 2:
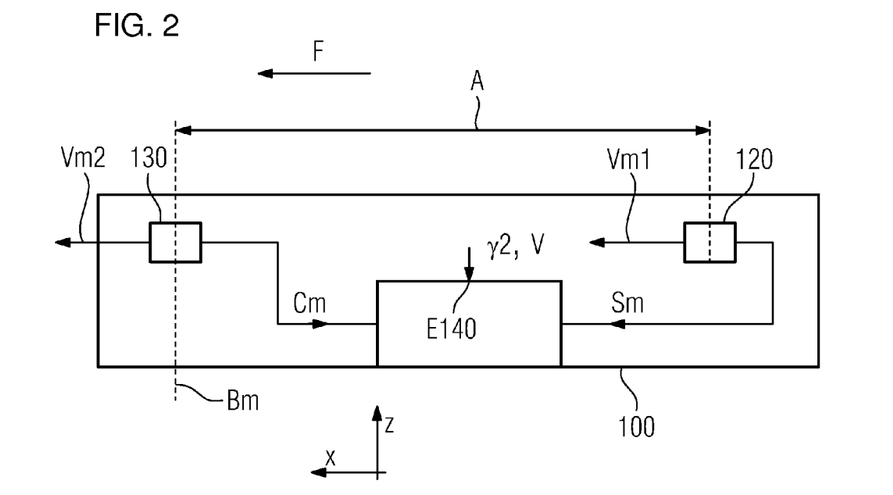
FIG. 2 shows one exemplary embodiment of a pole position measurement device according to the invention with magnetic field sensors which can rotate.
Figure 3:
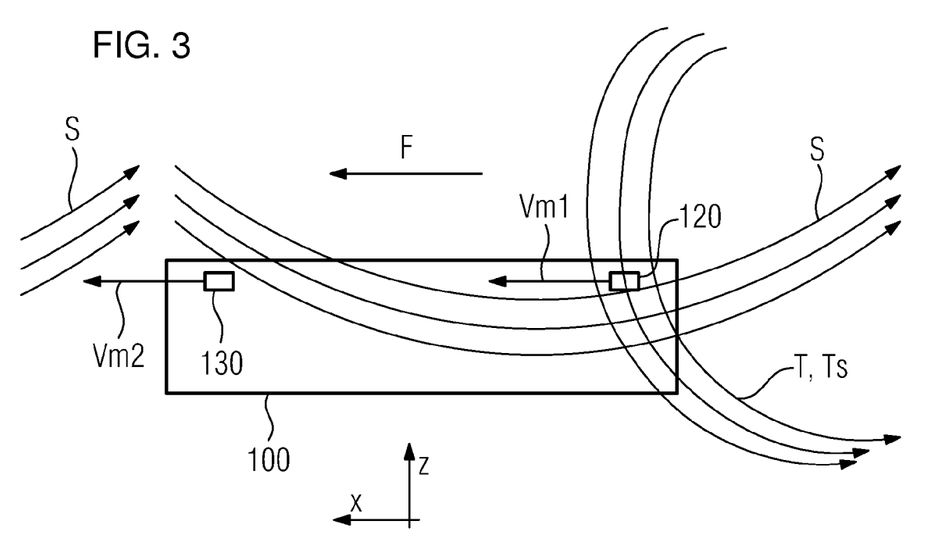
FIG. 3 shows the pole position measurement device as shown in FIG. 2 together with the stator magnetic field to be measured and the disturbing supporting magnet field.

A first exemplary embodiment of the pole position measurement device 100 as shown in FIG. 1 is illustrated in more detail, in the form of an enlarged illustration, in FIG. 2. The pole position measurement device 100 has a pair of magnetic field sensors for measurement of the stator magnetic field S of the track-side stator 30 (cf. FIG. 1); the two directionally selective magnetic field sensors 120 and 130 of the pair of magnetic field sensors can rotate, and are arranged at a predetermined distance A from one another. One of the two magnetic field sensors 120 and 130, in this case by way of example the magnetic field sensor 130, forms a measurement reference axis Bm for the pole position measurement device 100. The magnetic field sensors 120 and 130 may, for example, be formed by Hall sensors which are mounted such that they can rotate, or by magnetoresistive sensors which can rotate.

The pole position measurement device 100 also has an evaluation device 140 which is connected to the two magnetic field sensors 120 or 130 and whose purpose is to use the measured values Sm and Cm from the magnetic field sensors 120 and 130 to determine, for example to calculate, the pole position angle γ. The evaluation device 140 may, for example, be formed by a programmable microprocessor device.

The distance A between the two magnetic field sensors 120 and 130 is preferably τ/2, where τ denotes the wavelength of the fundamental of the stator magnetic field. For example, if the wavelength τ is 258 mm, the distance is, for example, 129 mm. However, in principle, shorter distances A are also possible, provided that the measured values Sm and Cm are appropriately corrected; this will not be described in any more detail here, for clarity reasons.

The magnetic field sensors 120 and 130 have preferred measurement directions Vm1 and Vm2, which are marked by appropriate arrows in FIG. 2; the preferred measurement directions Vm1 and Vm2 indicate which magnetic field components the magnetic field sensors 120 and 130 can measure, and the measurement directions to which they are sensitive. In the illustration shown in FIG. 2, the magnetic field sensors 120 and 130 are aligned by rotation about their rotation axis for example such that they can measure the x component of the magnetic field; with this alignment, they are accordingly not sensitive to the z component.

The evaluation device 140 uses the measured values Sm and Cm from the two magnetic field sensors 120 and 130 to determine the pole position angle γ. For this purpose, it first of all measures an auxiliary pole position angle γ1 between the measurement reference axis Bm of the pole position measurement device 100 and an auxiliary reference axis BS', which is offset through a multiple of 2π with respect to the magnetic reference axis Bs of the stator 30 (cf. FIG. 1).

It adds an offset angle γ2 to the auxiliary pole position angle γ1, which offset angle γ2 indicates the phase-angle offset between the magnetic reference axis Bf of the magnetic levitation vehicle 10 and the measurement reference axis Bm of the pole position measurement device 100. Integer multiples of $2\pi$ contained therein are subtracted from the resultant sum value $\gamma1+\gamma2$, thus resulting in the sought pole position angle $\gamma$ being formed. Mathematically speaking, the equation for calculation of the pole position angle $\gamma$ is therefore:

$$\gamma = (\gamma1+\gamma2) \mathrm{modulo}(2*\pi)$$

The offset angle $\gamma2$, which indicates the phase-angle offset between the magnetic reference axis Bf of the magnetic levitation vehicle 10 and the measurement reference axis Bm of the pole position measurement device 100, is determined as a function of the mechanical offset V as follows:

$$\gamma2 = V/\tau * \pi$$

The offset angle $\gamma2$ is, for example, predetermined in a fixed form for the evaluation device 140, and is stored in the evaluation device 140. Alternatively, the offset V can also be predetermined in a fixed form for the evaluation device 140 and can be stored therein; in this case, the evaluation device 140 itself uses the stated formula to calculate the offset angle $\gamma2$. The evaluation device 140 has an input connection E140 in order to input the offset V or the offset angle $\gamma2$.

Figure 4:
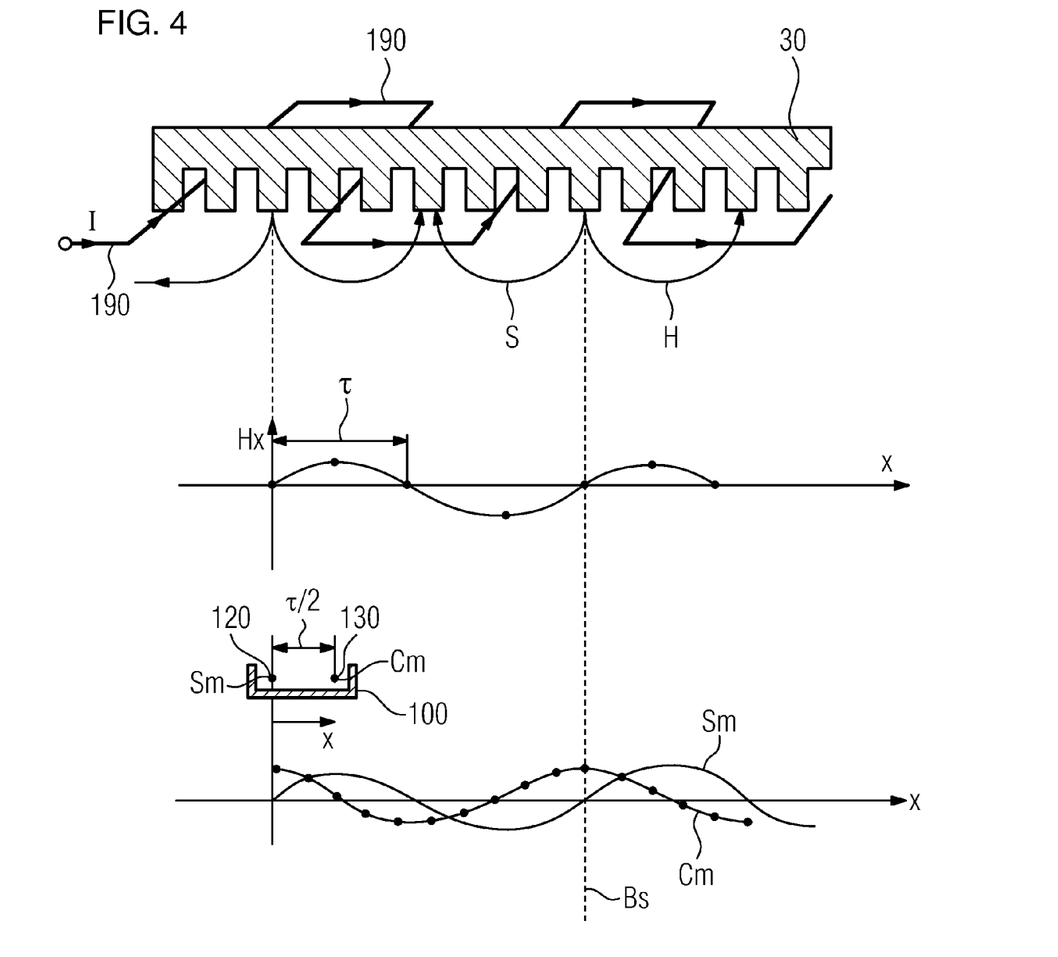
FIG. 4 shows measured-value profiles in order to explain the method of operation of the pole position measurement device as shown in FIG. 2, in the situation in which the magnetic field component is being measured in the x direction.
Figure 5:
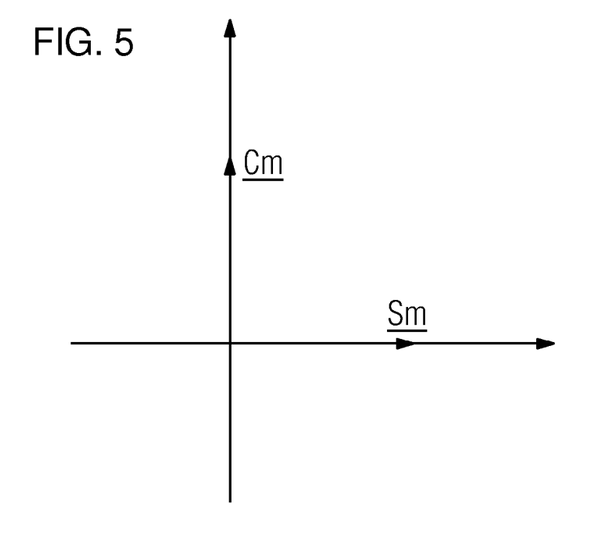
FIG. 5 shows complex measurement vectors relating to the measured-value profiles shown in FIG. 4, FIGS. 6-9 show examples of how a measurement is carried out using the pole position measurement device shown in FIG. 2.

In order to explain how the evaluation device 140 can form the auxiliary pole position angle $\gamma1$ using the measured values Sm and Cm, the following text will first of all provide an explanation, based on FIGS. 4 and 5, as to how this can be carried out when the preferred measurement directions of the magnetic field sensors 120 and 130 are aligned along the x direction, that is to say the vehicle longitudinal direction, and therefore measure the x component of the magnetic field. When the preferred measurement directions Vm1 and Vm2 are aligned in this way, the disturbance field component Ts of the supporting magnet field T is admittedly also measured, as is shown in detail in FIG. 3, but, at this stage, this will be ignored. Building on this, an explanation will then be provided, by way of example with reference to FIGS. 6 to 9, as to how the procedure is carried out when the preferred measurement directions Vm1 and Vm2 of the magnetic field sensors 120 and 130 are rotated such that the disturbance field component Ts of the supporting magnet field T is not also measured, or is at least measured only as little as possible.

The track-side stator 30 is shown in the upper part of FIG. 4; by way of example, a line 190 is shown, which belongs to the conductor coils arranged in the stator 30. The field profile of the magnetic field strength H of the stator magnetic field S is also shown.

The central section of FIG. 4 shows the profile of the amplitude Hx of the magnetic field strength H in the vehicle longitudinal direction x. As can be seen, the field strength has a sinusoidal profile.

The lower section of FIG. 4 shows a sketch of the pole position measurement device 100 with the two magnetic field sensors 120 or 130; the distance A in this case is $\tau/2$, as a result of which the two magnetic field sensors produce measurement signals at right angles to one another. By way of example, it will now be assumed that the right-hand magnetic field sensor 120 in FIG. 3 produces measured values Sm on the sine trace, and that the left-hand magnetic field sensor 130 in FIG. 3 produces measured values Cm on the cosine trace; this means that the magnetic field sensor 120 produces a sine-wave profile as the measurement signal when it is moved forward in the direction of travel starting from the position x=0, and that the magnetic field sensor 130 produces a cosine profile as the measurement signal when it is moved forwards in the direction of travel starting from the point x=0. The auxiliary pole position angle $\gamma1$ changes in a corresponding manner relative to the reference axis Bs with a movement in the x direction.

The measured-value profiles in this case are as follows, mathematically speaking:

$$Sm(x) = H0 \cdot \sin\left(\frac{x}{\tau} \cdot 2\pi\right) = H0 \cdot \sin(\gamma1)$$

$$Cm(x) = H0 \cdot \cos\left(\frac{x}{\tau} \cdot 2\pi\right) = H0 \cdot \cos(\gamma1)$$

where H0 denotes the signal amplitude of the magnetic field, which is approximately the same for both magnetic field sensors.

The auxiliary pole position angle $\gamma1$ can therefore be determined as follows:

$$\frac{Sm(x)}{Cm(x)} = \frac{H0 \cdot \sin(\gamma1)}{H0 \cdot \cos(\gamma1)}$$

$$\Rightarrow \gamma1 = a\tan2\left[\frac{Sm(x)}{Cm(x)}\right]$$

In this case, as is known, the function atan 2 should be understood as meaning the reciprocal function of the angle function tangent, in the case of which a validity range from $-\pi$ to $+\pi$, that is to say one complete period of the sought angle $\gamma1$, is achieved, in addition to the quotient $\tan(x)=\sin(x)/\cos(x)$, by consideration of the mathematical sign of the numerator; in contrast, the function atan(x) is defined only in the range $-\pi/2$ to $+\pi/2$.

For further illustration, FIG. 5 also shows the associated vector representation of the measured values Sm and Cm. As can be seen, the two vectors Sm and Cm are at right angles to one another.

As already mentioned initially, the above explanations in conjunction with FIGS. 4 and 5 ignore the fact that the supporting magnet field T produces a disturbance field component Ts, which corrupts the measurement results of the two magnetic field sensors 120 and 130, in the edge area of the supporting magnet 60.

Figure 6:
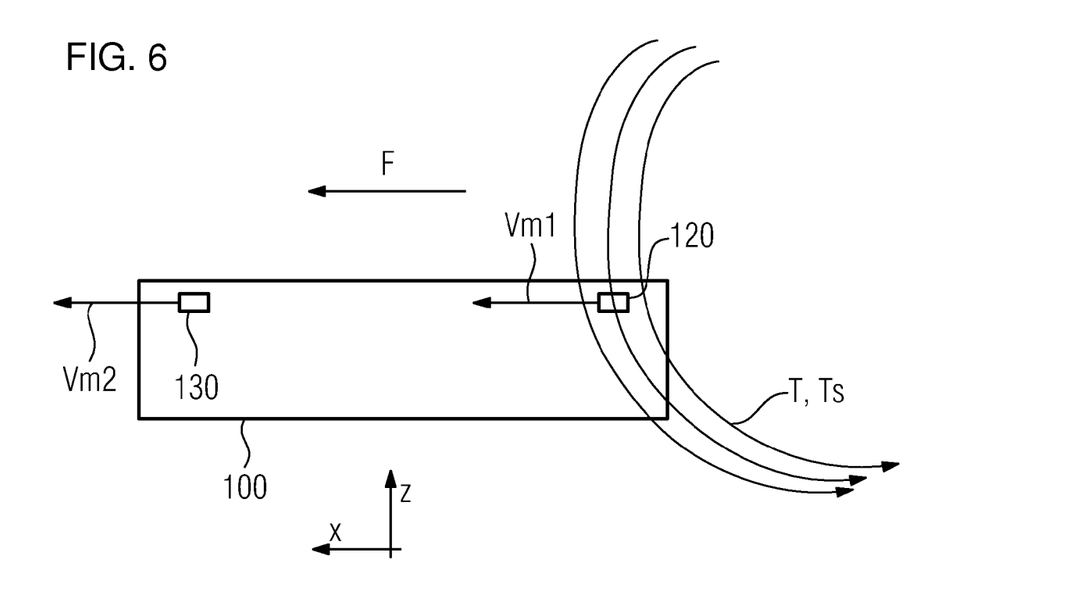

In order to measure the stator magnetic field as accurately as possible, the preferred measurement directions Vm1 and Vm2 of the magnetic field sensors 120 and 130 are now aligned such that that magnetic field sensor 120 which is located closer to the supporting magnet 60 detects as little as possible of the disturbance field component Ts of the supporting magnet field T. By way of example, the following procedure can be used to achieve this:

In a first step, only the supporting magnet field T is switched on, as a result of which the magnetic levitation vehicle 10 starts to be levitated. At this time, the stator magnetic field S has not yet been switched on or—if it has already been switched on—is switched off. All that therefore occurs is the supporting magnet field T with its disturbance field component Ts. This is shown in FIG. 6.

The preferred measurement direction Vm1 on that magnetic field sensor 120 which is located closer to the supporting magnet 60 is then rotated such that it no longer measures the disturbance field component Ts of the supporting magnet field, or measures it only as little as possible: for this purpose, by way of example, the preferred measurement direction Vm1 can first of all be rotated until a maximum measurement signal is measured, and a preferred measurement direction which is at right angles to this measurement direction is then set; alternatively, the preferred measurement direction Vm1 can be rotated directly until a minimum measurement signal is measured.

Figure 7:
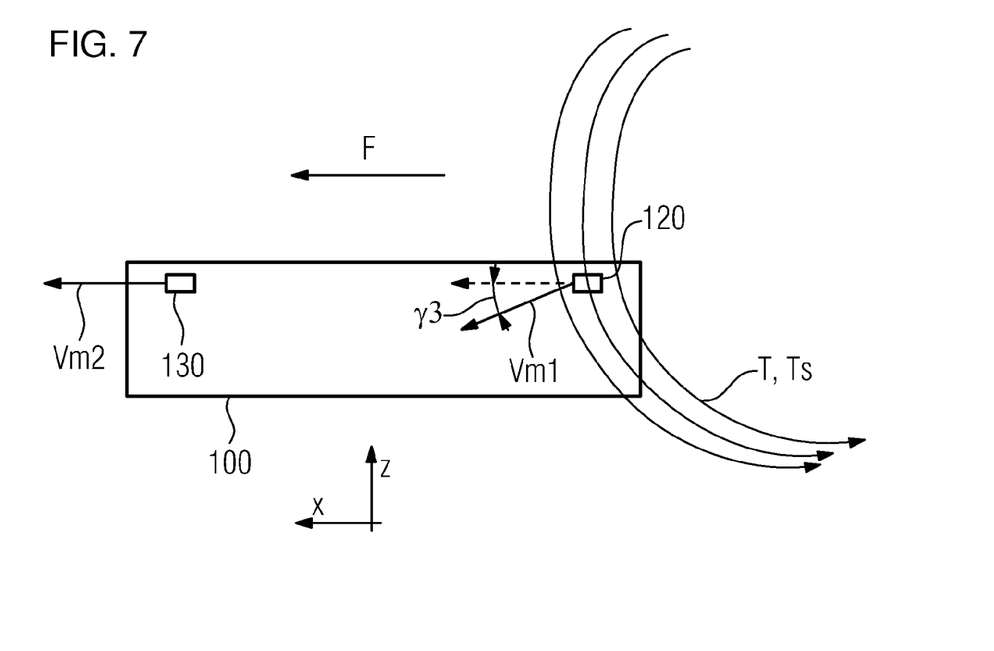

After completion of the adjustment of the preferred measurement direction Vm1 of the magnetic field sensor 120, the preferred measurement direction Vm1 will have been rotated through a rotation angle γ3 with respect to the x direction; this is shown in FIG. 7.

Figure 8:
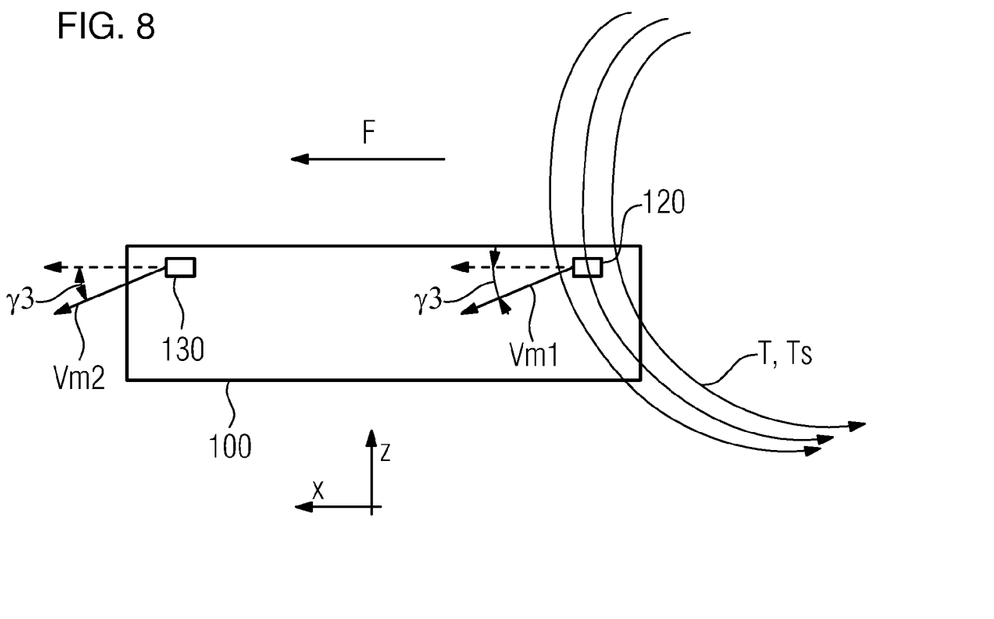

The preferred measurement direction Vm2 of the magnetic field sensor 130 is then likewise rotated through this rotation angle γ3; this is shown in FIG. 8.

Figure 9:
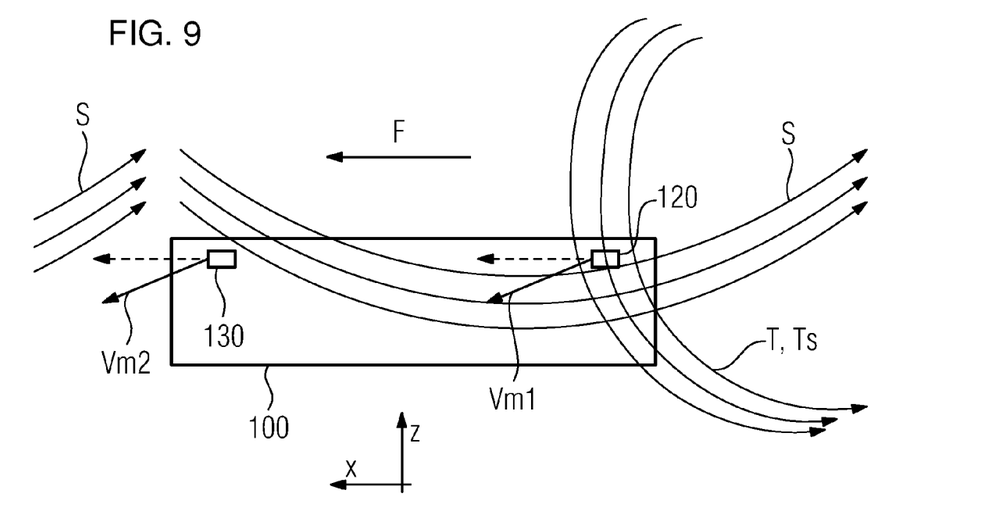

The stator magnetic field S is then switched on again, as is shown in FIG. 9, as a result of which it is possible to start the measurement of the stator magnetic field S. In this case, the influence of the disturbance field component Ts of the supporting magnet field T is minimal, because of the previously carried out adjustment of the preferred measurement directions Vm1 and Vm2 of the two magnetic field sensors.

The rotation angle γ3 must now be taken into account by the evaluation device 140 in the determination of the auxiliary pole position angle γ1. By way of example, this can be done as follows:

the field strength vector Hs of the stator magnetic field S can be described approximately, mathematically, as follows:

$$Hs = \begin{pmatrix} Hsx \\ Hsz \end{pmatrix} = \begin{pmatrix} H0 \cdot \sin\left(\omega \cdot t - \frac{x \cdot \pi}{\tau}\right) \\ H0 \cdot \cos\left(\omega \cdot t - \frac{x \cdot \pi}{\tau}\right) \end{pmatrix}$$

where Hsx denotes the x component of the field strength vector Hs and Hsz denotes the z component of the field strength vector Hs; the y component of the field strength vector is approximately equal to zero.

The field strength vector Ht of the disturbance field component of the supporting magnet field T is given by:

$$Ht = \begin{pmatrix} Htx \\ Htz \end{pmatrix} = \begin{pmatrix} Ht0 \cdot \cos\alpha \\ Ht0 \cdot \sin\alpha \end{pmatrix}$$

where Htx denotes the x component of the field strength vector Ht, and Htz denotes the z component of the field strength vector Hs; the y component of the field strength vector is approximately equal to zero. α denotes the angle of the field strength vector Ht of the supporting magnet field T relative to the x coordinate axis.

Once the preferred measurement directions Vm1 and Vm2 have been rotated through the rotation angle γ3, as has been explained in conjunction with FIGS. 6-9, the preferred measurement direction Vm1 is at right angles to the field direction of the supporting magnet field T. Therefore, in consequence:

γ3=90°+α

The two magnetic field sensors 120 and 130 will therefore at least approximately measure only the field strength vector Hs of the stator magnetic field S, and the supporting magnet field T can be ignored.

However, it should be noted that, as a result of the rotation of the preferred measurement directions Vm1 and Vm2 through the rotation angle γ3, it is now no longer only the x component Hsx of the stator magnetic field S that is measured, but, instead of this, a linear combination of the x component Hsx and the z component Hsz. The measured values Sm and Cm of the two magnetic field sensors 120 and 130 are therefore as follows:

Sm(x)=H0·sin(γ1)·cos(γ3)+H0·cos(γ1)·sin(γ3)

Cm(x)=H0·cos(γ1)·cos(γ3)+H0·sin(γ1)·sin(γ3)

After a number of mathematical reorganization processes, this therefore results in:

Sm(x)=H0·sin(γ1+γ3)

Cm(x)=H0·cos(γ1+γ3)

The auxiliary pole position angle γ1 is therefore given by:

$$\frac{Sm(x)}{Cm(x)} = \frac{H0 \cdot \sin(\gamma 1 + \gamma 3)}{H0 \cdot \cos(\gamma 1 + \gamma 3)}$$

$$\Rightarrow \gamma 1 = a\tan 2\left[\frac{Sm(x)}{Cm(x)}\right] - \gamma 3$$

The sought pole position angle γ is then calculated as follows:

$$\gamma = \left(a\tan 2\left[\frac{Sm(x)}{Cm(x)}\right] - \gamma 3 + \gamma 2\right) \text{modulo}(2 * \pi)$$

Figure 10:
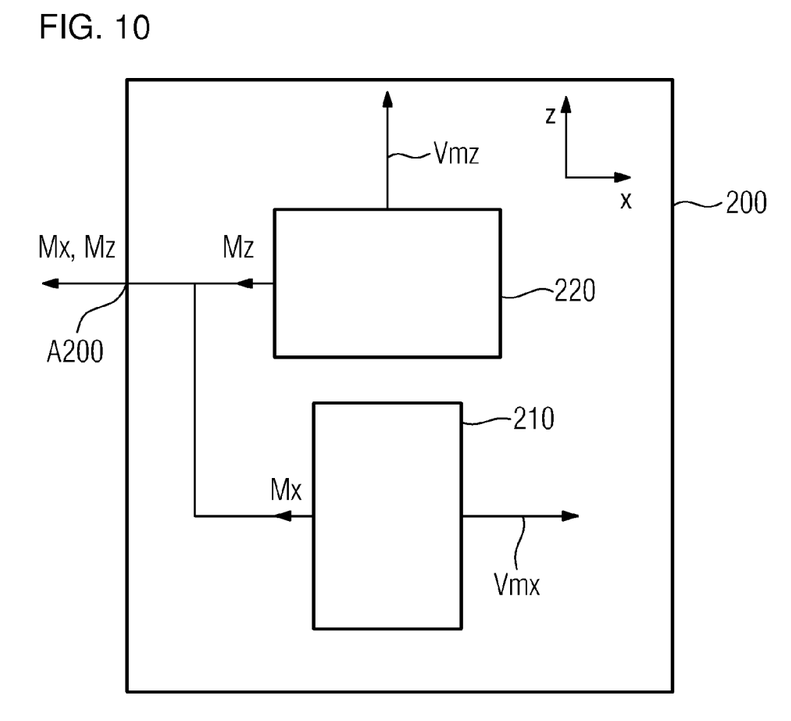
FIG. 10 shows one exemplary embodiment of a magnetic field sensor with two individual sensors which measure at right angles.

By way of example, the exemplary embodiment for the pole position measurement device 100 is being based on the assumption that the two magnetic field sensors can rotate. FIG. 10 shows a different exemplary embodiment for a magnetic field sensor. In this exemplary embodiment, the magnetic field sensor 200 is equipped with two individual sensors 210 and 220 which are aligned at right angles to one another and measure on a directionally selective basis, and which sensors may, for example, be Hall sensors. The individual sensor 210 has a preferred measurement direction Vmx, and the individual sensor 220 has a preferred measurement direction Vmz; this means that the individual sensor 210 is sensitive in the x direction, and the individual sensor 220 is sensitive in the z direction. The corresponding measured values Mx and Mz are emitted at an output A200.

Figure 11:
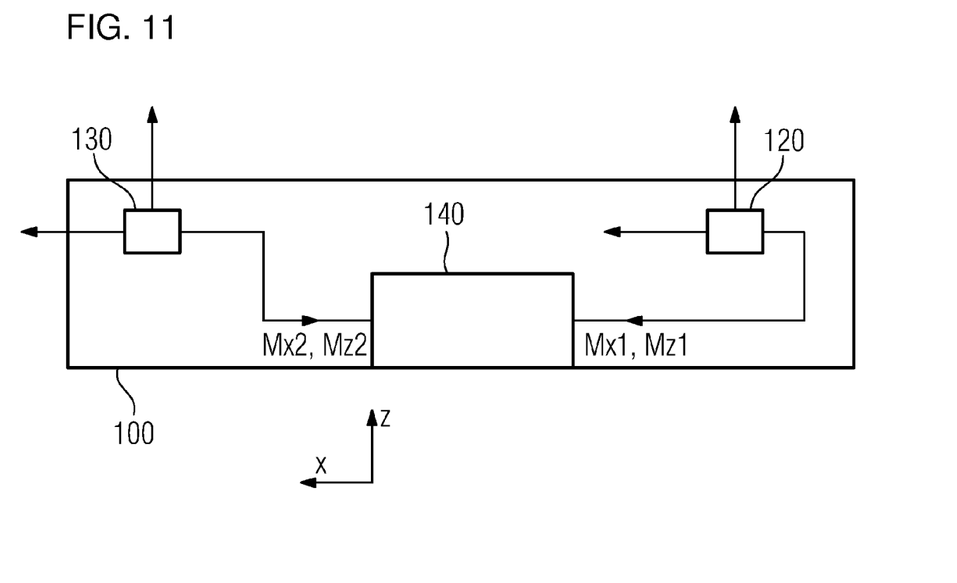
FIG. 11 shows a further exemplary embodiment of a pole position measurement device according to the invention, in which magnetic field sensors as shown in FIG. 10 are used.

FIG. 11 shows one exemplary embodiment of a pole position measurement device 100, which is equipped with two magnetic field sensors 120 and 130 as shown in FIG. 10. The evaluation device 140 is now designed such that it evaluates the measurement results Mx1, Mx2, Mz1, Mz2 from the total of four individual sensors. This avoids the need to mechanically rotate the magnetic field sensors, and allows the rotation to be carried out only "mathematically".

If, for example, the intention is to use the magnetic field sensor 120 for measurement in a preferred measurement direction Vm1 rotated through the rotation angle γ3 relative to the x axis, then the measured value Sm(x) from the magnetic field sensor 120 in the preferred measurement direction Vm1 is determined, using the measured values Mx1 in the x direction and Mz1 in the z direction of the associated individual sensors, as follows:

Sm(x)=Mx1*cos(γ3)−Mz1*sin(γ3)

A corresponding procedure applies to the magnetic field sensor 130. If the intention is to use this for measurement in a preferred measurement direction Vm2 which has been rotated through the rotation angle γ3 relative to the x axis, then the measured value Cm(x) from the magnetic field sensor 130 in the preferred measurement direction Vm2 is determined using the measured values Mx2 in the x direction and Mz2 in the z direction of the associated individual sensors, as follows:

$$Cm(x) = Mx2 * \cos(\gamma 3) - Mz2 * \sin(\gamma 3)$$

Once again, these values result in the auxiliary pole position angle γ1, as follows:

$$\frac{Sm(x)}{Cm(x)} = \frac{H0 \cdot \sin(\gamma 1 + \gamma 3)}{H0 \cdot \cos(\gamma 1 + \gamma 3)}$$

$$\Rightarrow \gamma 1 = a\tan 2\left[\frac{Sm(x)}{Cm(x)}\right] - \gamma 3$$

The sought pole position angle γ is then calculated as follows:

$$\gamma = \left(a\tan 2\left[\frac{Sm(x)}{Cm(x)}\right] - \gamma 3 + \gamma 2\right) \operatorname{modulo}(2 * \pi)$$

Figure 12:
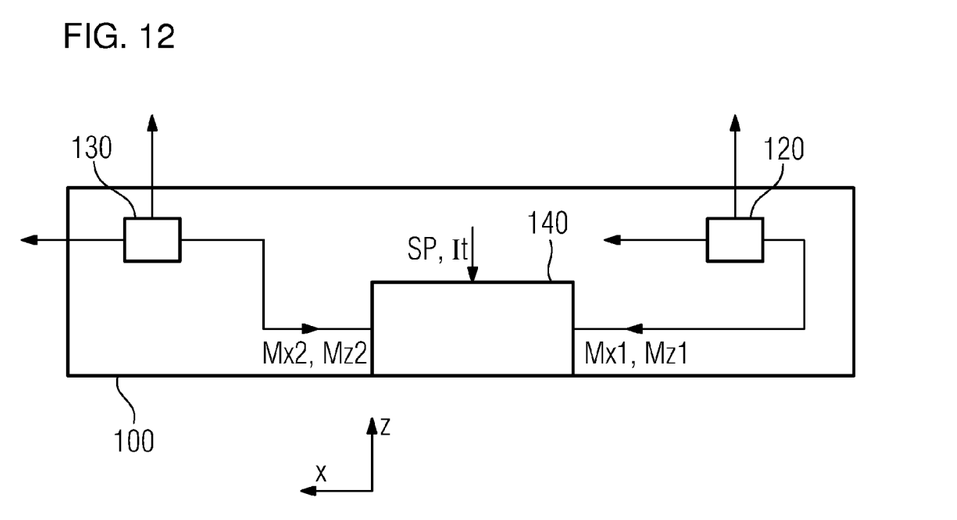
FIG. 12 shows a third exemplary embodiment of a pole position measurement device according to the invention, in which the optimum measurement direction for the magnetic field sensors is set as a function of the respective gap between the supporting magnet and the reaction rail and as a function of the respective supporting magnet current.

FIG. 12 shows a further exemplary embodiment of a pole position measurement device. In contrast to the exemplary embodiments shown in FIGS. 2 and 11, the evaluation device 140 processes different measured values, in order to determine the preferred measurement directions Vm1 and Vm2 and the optimum rotation angle γ3, and to set and evaluate the magnetic field sensors 120 and 130 appropriately.

Specifically, the evaluation device 140 takes account of a gap distance measured value SP which is applied to the input side and indicates the respective gap distance between the supporting magnet 60 and the track-side reaction rail 30 of the magnetic levitation railroad track. In addition, the evaluation device 140 takes account of a supporting magnet current measured value It, which is applied on the input side and indicates the supporting magnet current through the supporting magnet 60.

The evaluation device 140 has a stored table which indicates the respective best rotation angle γ3 as a function of the respective gap distance measured value SP and the respective supporting magnet current value It.

The table is preferably produced in advance by measuring the optimum measurement direction in each case for different gap distances SP and different supporting magnet currents It. The table can be produced by the evaluation device 140 itself or else, having been produced by or with some other appliance, can be stored in the evaluation device for further pole position measurement operation.

Once the respective optimum rotation angle γ3 has been read from the table as a function of the gap value and current value, the evaluation device 140 sets the magnetic field sensors 120 and 130 appropriately, if these are magnetic field sensors which can rotate (cf. FIGS. 2-9), or evaluates their measured values appropriately, if the magnetic field sensors have orthogonal individual sensors, as has been described in conjunction with FIGS. 10 and 11. The pole position angle is then determined in the manner described above.

As has been shown with reference to the exemplary embodiments described above, the pole position measurement device can be fitted in front of the foremost supporting magnet of the magnetic levitation vehicle or behind the rearmost supporting magnet of the magnetic levitation vehicle, in the direction of travel. Alternatively and likewise advantageously, the pole position measurement device may, however, also be arranged differently, to be precise offset laterally (in the vehicle y direction) alongside the supporting magnet 60 of the magnetic levitation vehicle 10, in such a way that the pole position measurement device is operated there. In this case as well, the stray fields of the supporting magnet or magnets 60 can be masked out in the manner described above. Furthermore, in the case of an arrangement at the side alongside the supporting magnets, it is possible to mount the pole position measurement device not only at the front and/or rear but additionally or alternatively also in the central area of the magnetic levitation vehicle.

LIST OF REFERENCE SYMBOLS

10 Magnetic levitation vehicle
20 Magnetic levitation railroad track
30 Track-side stator
40 Stator slots
50 Stator teeth
60 Supporting magnet
70 Magnet coils
100 Pole position measurement device
110 Support
120, 130 Magnetic field sensors
140 Evaluation device
E140 Input connection
190 Line
200 Magnetic field sensor
210 Individual sensor
220 Individual sensor
A Distance
Bm Magnetic reference axis of the pole position measurement device
Bs Magnetic reference axis of the stator
BS' Auxiliary reference axis
Bf Magnetic reference axis of the magnetic levitation vehicle
H Magnetic field strength
Mx, My Measured values of the individual sensors
S Fundamental of the stator magnetic field
T Supporting magnet field
Ts Disturbance field component of the supporting magnet field
V Offset
Sm, Cm Measured values
Sm, Cm Vectors
α Direction angle of the supporting magnet field
γ Pole position angle
γ2 Offset angle
γ1 Auxiliary pole position angle
γ3 Rotation angle

The invention claimed is:

1. A method of measuring a pole position angle between a stator magnetic field of a track-side stator of a magnetic levitation railroad track and a magnetic reference axis of a magnetic levitation vehicle located on the magnetic levitation railroad track, which comprises, when the supporting magnet of the magnetic levitation vehicle is switched on:

measuring a direction component of the stator magnetic field with a pair of magnetic field sensors, the direction component being predetermined by a preferred measurement direction of the magnetic field sensors, thereby setting the preferred measurement direction such that at least one of the two magnetic field sensors has a minimum measurement sensitivity for the supporting magnetic field of the supporting magnet; and determining the pole position angle from the measured values of the two magnetic field sensors.

2. The method according to claim 1, which comprises measuring the measurement direction for which the at least one magnetic field sensor measures a minimum measured value of the supporting magnetic field, and using the measured measurement direction as the preferred measurement direction for measuring the pole position angle.

3. The method according to claim 1, which comprises measuring the measurement direction for which the at least one magnetic field sensor measures a maximum measured value for the supporting magnetic field, and using a direction perpendicular to the measurement direction as the preferred measurement direction for measuring the pole position angle.

4. The method according to claim 1, which comprises choosing the preferred measurement direction so that the magnetic field sensor that is located closer to the supporting magnet has a minimum measurement sensitivity for the supporting magnetic field of the supporting magnet.

5. The method according to claim 1, which comprises:
first rotating the at least one magnetic field sensor such that the sensor has a minimum measurement sensitivity for the supporting magnetic field; and
subsequently rotating the other of the two magnetic field sensors in the same measurement direction.

6. The method according to claim 1, which comprises:
providing each of the two magnetic field sensors with two individual sensors aligned perpendicularly to one another;
using measurement results of the two individual sensors of the at least one magnetic field sensor to determine the measurement direction for which this magnetic field sensor achieves a minimum measurement sensitivity for the supporting magnetic field;
treating the measurement direction thus determined as the preferred measurement direction; and
evaluating each of the measurement results of the individual sensors of the two magnetic field sensors, forming a measured value for the preferred measurement direction.

7. The method according to claim 1, which comprises determining the preferred measurement direction to be used for the measurement with the stator magnetic field switched off, by the measurement direction for which the at least one magnetic field sensor has a minimum measurement sensitivity for the supporting magnetic field of the supporting magnet being measured for the at least one magnetic field sensor.

8. The method according to claim 1, which comprises:
measuring a respective gap distance between the supporting magnet and a track-side reaction rail of the magnetic levitation railroad track; and
setting the preferred measurement direction to correspond to a preset value, which is predetermined individually for the gap distance.

9. The method according to claim 8, which comprises determining the preset value individually for the gap distance by:
determining for different gap distances in each case a measurement direction for which the at least one magnetic field sensor has a minimum measurement sensitivity for the supporting magnetic field of the supporting magnet; and
using the measurement direction that is determined individually for the gap distance as the preset value that is predetermined individually for the gap distance.

10. The method according to claim 1, which comprises:
measuring a respective supporting magnet current; and
setting the preferred measurement direction to correspond to a preset value that is predetermined individually for the supporting magnet current.

11. The method according to claim 10, which comprises determining the preset value individually for the supporting magnet current by:
determining for different supporting magnet currents in each case individually the measurement direction for which the at least one magnetic field sensor has a minimum measurement sensitivity for the supporting magnetic field of the supporting magnet; and
using the measurement direction which is determined individually for the supporting magnet current as the preset value that is predetermined individually for the supporting magnet current.

12. A pole position measurement device for a magnetic levitation vehicle of a magnetic levitation railroad, comprising:
two magnetic field sensors for measurement of a stator magnetic field of a track-side stator, said two magnetic field sensors being disposed at a predetermined distance from one another; and
an evaluation device configured to use measured values from said two magnetic field sensors to determine a pole position angle between the stator magnetic field and a magnetic reference axis of a magnetic levitation vehicle;
said two magnetic field sensors having an adjustable preferred measurement direction to enable a desired direction component of the stator magnetic field to be measured; and
said evaluation device being configured to set the preferred measurement direction such that at least one of said two magnetic field sensors has a minimum measurement sensitivity for the supporting magnetic field of the supporting magnet.

13. The pole position measurement device according to claim 12, wherein said evaluation device is configured to set the preferred measurement direction of the said magnetic field sensor that is located closer to the supporting magnet to a minimum measurement sensitivity for the supporting magnetic field of the supporting magnet.

14. The pole position measurement device according to claim 12, wherein said two magnetic field sensors is rotatably mounted.

15. The pole position measurement device according to claim 14, wherein said evaluation device is configured to:
first rotate said at least one magnetic field sensor to have a minimum measurement sensitivity for the supporting magnetic field; and subsequently rotate the other of said two magnetic field sensors in the same measurement direction.

16. The pole position measurement device according to claim 12, wherein each of said two magnetic field sensors is formed with two individual sensors that are aligned perpendicularly to one another.

17. The pole position measurement device according to claim 16, wherein said evaluation device is configured to:
   determine the measurement direction for which the at least one magnetic field sensor achieves a minimum measurement sensitivity for the supporting magnetic field, based on measurement results of said two individual sensors of said at least one magnetic field sensor;
   treat the measurement direction found in this way as the preferred measurement direction; and
   evaluate the measurement results from each of said individual sensors of said two magnetic field sensors, forming a measured value for the preferred measurement direction.

18. The pole position measurement device according to claim 12, wherein said evaluation device is configured to set the preferred measurement direction as a function of a measured gap between the supporting magnet and a reaction rail, and/or as a function of a measured supporting magnet current through the supporting magnet.

* * * * *